United States Patent
Cruickshank

(12) 
(10) Patent No.: US 6,816,468 B1
(45) Date of Patent: Nov. 9, 2004

(54) CAPTIONING FOR TELE-CONFERENCES

(75) Inventor: Brian Cruickshank, Oakville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/465,645

(22) Filed: Dec. 16, 1999

(51) Int. Cl.[7] .......................... H04L 12/16; H04L 12/66
(52) U.S. Cl. ........................ 370/260; 370/352; 370/356; 379/202.01; 455/416
(58) Field of Search ................................ 370/260, 352, 370/357, 356, 261; 379/67.1, 201.01, 202.01, 205.01, 88.14; 455/414, 416; 79/204; 348/14.08; 704/275, 272, 2, 270.1

(56) References Cited

U.S. PATENT DOCUMENTS

| | | | |
|---|---|---|---|
| 5,440,624 A | 8/1995 | Schoof, II | 379/202 |
| 5,710,591 A | 1/1998 | Bruno et al. | 348/15 |
| 6,389,114 B1 * | 5/2002 | Dowens et al. | 379/52 |
| 6,606,373 B1 * | 8/2003 | Martin | 379/88.01 |

* cited by examiner

*Primary Examiner*—Duc Ho
(74) *Attorney, Agent, or Firm*—Kevin L. Smith

(57) ABSTRACT

A teleconferencing system, including apparatus and methods, for providing transcription and/or translation services during a teleconference is disclosed. The disclosed teleconferencing system establishes a voice connection and a data connection with participants to the teleconference desiring transcription services. The speech of each participant to the teleconference is transcribed using voice recognition technology in real or near-real time. Additionally, the transcribed text may be translated into a participant's desired language. The translation may be generated in real or near-real time on a word by word basis or alternatively, on a phrase by phrase or sentence by sentence basis. The translated and transcribed text is displayed for a participant using the established data connection. The transcribed (and possibly translated) text may be displayed in real or near-real time during a participant's speech. Audio translation services are also provided to a participant using text to speech software to generate an audio signal from the translated and transcribed text.

19 Claims, 11 Drawing Sheets

CAPTIONING FOR TELE-CONFERENCES

FIELD OF THE INVENTION

The invention relates to the provision of a telephone conferencing (also referred to as an audio conferencing) system. More particularly, the invention provides for transcription and, if desired, text and audio translation of the speech of participants to a teleconference hosted by the disclosed telephone conferencing system.

BACKGROUND TO THE INVENTION

A telephone or audio conference (hereinafter "teleconference") enables multiple teleconference participants to hear and be heard by all other participants to the teleconference. In some telephone conferencing systems a conference is pre-arranged for a specific time and a specified number of users or participants. According to this arrangement, a specific telephone number or telephone extension and the necessary facilities (i.e., the necessary audio bridge ports) are reserved for the teleconference. In other telephone conferencing systems, such as those provided for by a Private Branch Exchange (PBX) or through the Public Switched Telephone Network (PSTN), the teleconference is implemented "on-the-fly". That is, an initiating user, who may also be a participant, connects to a second participant. This second participant is then placed on hold, and the initiating user calls and connects to a third participant. The initiating user, through the use of a specific key or key sequence, allows the second participant to re-join and the conference can then commence. The process of having the initiating participant put the other conference participants on hold while adding additional participants can then be repeated.

While the popularity of teleconferencing has increased, its popularity and world-wide acceptance has revealed many problems. Foremost amongst these problems are the difficulties encountered with participants speaking different languages. With different languages being spoken, or non-native languages being spoken by multi-lingual participants, difficulties are encountered not only with simply communicating but numerous difficulties are encountered due to subtleties in language and persons misconstruing the meanings of complex words or phrases. Moreover, upon completion of the teleconference no written record of the conference is available.

To address this problem, real-time translation has been implemented using human translators. An example of this model is used during discourse at the United Nations. For each language spoken there is a separate audio feed staffed by a human interpreter. The interpreter assigned to a specific audio feed, listens, translates and rephrases what has been spoken into a specific language which is then transmitted to users wishing to listen. As can well be imagined, the number of translators necessary to translate from all possible languages into all possible languages is extremely expensive. Moreover, written transcripts are typically generated from tapes at a much later time and through considerable human effort.

Many teleconferencing systems are known and have been disclosed in the art. For example, Bruno, in U.S. Pat. No. 5,410,591 entitled "Method and Apparatus for Recording and Indexing an Audio and Multimedia Conference" issued Jan. 20, 1998, discloses a method and apparatus for recording and indexing audio information exchanged during an audio conference call, or video, audio and data information exchanged during a multimedia conference. For an audio conference, Bruno discloses a computer connected to an audio bridge for recording the audio information along with an identification signal for correlating each conference participant with that participant's statements. The computer connected to the audio bridge provides recording and indexing of received audio signals and may provide transcription services.

These systems for providing written records of teleconferences and translation of those conferences are not economically feasible for widespread adoption.

The systems in the art do not suggest a cost-effective system for providing real-time textual representations in a participant's native language nor for providing translation text or audio.

SUMMARY OF THE INVENTION

A teleconferencing system is disclosed allowing voice and data communication between the teleconference bridge server and participants. The teleconferencing system enables the speech of each participant to the teleconference to be transcribed, using speech to text recognition software, and translated into a participant's desired language prior to merger of a participant's input with that of other participants. The transcribed and translated text is then displayed on a display terminal of participants to the teleconference. Additionally, the teleconferencing system enables audio translation facilities by using text to speech synthesizing software to generate an audio signal corresponding to the transcribed and translated generated text.

The translation and transcription facilities may be distributed between a participant's computer and the facilities of the teleconference bridge server using a client-server style architecture. Alternatively, and perhaps simultaneously, the translation and transcription facilities may be provided centrally by the teleconference server allowing the transcription and translation services to be accessed by participants using display terminals which do not have the capacity to perform speech to text conversions.

In one aspect of the present invention there is provided a teleconferencing system comprising: a network interface communicating with a data network; an audio interface for communication with a voice network; a processor in communication with the network interface, the audio interface, the processor adapted to: receive voice data from the voice network transmitted from a first station; receive data from the first station over the data network, the data corresponding to a textual representation of the received voice data, the textual representation being in a first language; translate the received data corresponding to text in a first language into translated data corresponding to text in a second language; transmit the received voice data over the voice network to a second station; and transmit the translated data over the data network to the second station.

In another aspect of the present invention there is provided a system providing transcripts of an audio teleconference, the system comprising: a teleconference bridge server in communication with a voice network and a data network; a first station in communication with the voice network and the data network, the second station comprising: a telephone appliance in communication with the voice network; and a computer in communication with the telephone appliance and the data network; a second station in communication with the voice network and the data network, the first station comprising: a telephone appliance in communication with the voice network; and a computer in communication with the telephone appliance and the data network; the telephone appliance of the first station adapted to transmit audio data to the computer and to transmit the audio data to the teleconference bridge server over the voice network; the computer of the first station adapted to: receive the audio data via the telephone appliance; transcribe the audio data into textual data; transmit the textual data to the teleconference bridge server over the data network; receive textual data over the data network from the teleconference bridge server; display the received textual data on a display device; the teleconference bridge server adapted to: receive audio data from the voice network from the first station; transmit audio data over the voice network to the second station; receive the textual data transmitted from the first station over the data network; and transmit the received textual data to the second station over the data network.

In another aspect of the present invention there is provided a teleconference bridge server comprising: a first input/output port in communication with a data network; a second input/output port in communication with a voice network; a central processing unit in communication with the first and second input/output ports, the central processing unit adapted to: receive audio data from a first station on the voice network through the second input/output port; transcribe the received audio data into textual data; transmit the received audio data over the voice network through the second input/output port to a second station; transmit the textual data over the data network through the first input/output port to the second station.

In another aspect of the present invention there is provided a client station to a teleconference bridge server, the client station comprising: a telephone appliance for connecting with a voice network; a computer in communication with the telephone appliance, the computer comprising: a first input/output port for connecting with a data network; a second input/output port in communication with the telephone appliance; a display; a memory; a central processing unit in communication with the first and second input/output ports, the display and the memory, the central processing unit adapted to: receive audio data from the telephone appliance through the second input/output port; transcribe the received audio data into text data; transmit the text data to the teleconference bridge server through the first input/output port and over the data network; receive text data from the teleconference bridge server through the first input/output port and over the data network; and display the text data on the display; the telephone appliance for transmitting the voice to both the voice network and the computer.

In another aspect of the present invention there is provided a method of providing teleconferencing services by a teleconference server, the method comprising: for each of a plurality of participants: receiving a call over a voice network from a participant; determining the participant's facilities; determining the services required by the participant; if the participant's facilities comprise a computing device, establishing a data connection with the computer over a data network; receiving a voice audio signal from the participant; transmitting the voice audio signal from the participant to other participants over the voice network; and transmitting text corresponding to the voice audio signal over the data network to the other participants.

In another aspect of the present invention there is provided a computer readable media comprising computer readable computer code to adapt a general purpose computer to: for each of a plurality of participants: receive a call over a voice network from a participant; determine the participant's facilities; determine the services required by the participant; if the participant's facilities comprise a computing device, establish a data connection with the computer over a data network; receive a voice audio signal from the participant; transmit the voice audio signal from the participant to other participants over the voice network; and transmit text corresponding to the voice audio signal over the data network to the plurality of participants.

In another aspect of the present invention there is provided a method for enabling teleconferencing, comprising: receiving voice input from a first participant in a teleconference; converting the voice input of the first participant to text; translating the text from a first language to a second language; transmitting to a second participant the voice input of the first participant and a signal based on the translated text.

In another aspect of the present invention there is provided a computer readable media comprising computer readable computer code to adapt a general purpose computer to: receive voice input from a first participant in a teleconference; convert the voice input of the first participant to text; translate the text from a first language to a second language; transmit to a second participant the voice input of the first participant and a signal based on the translated text.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

Figure 1:
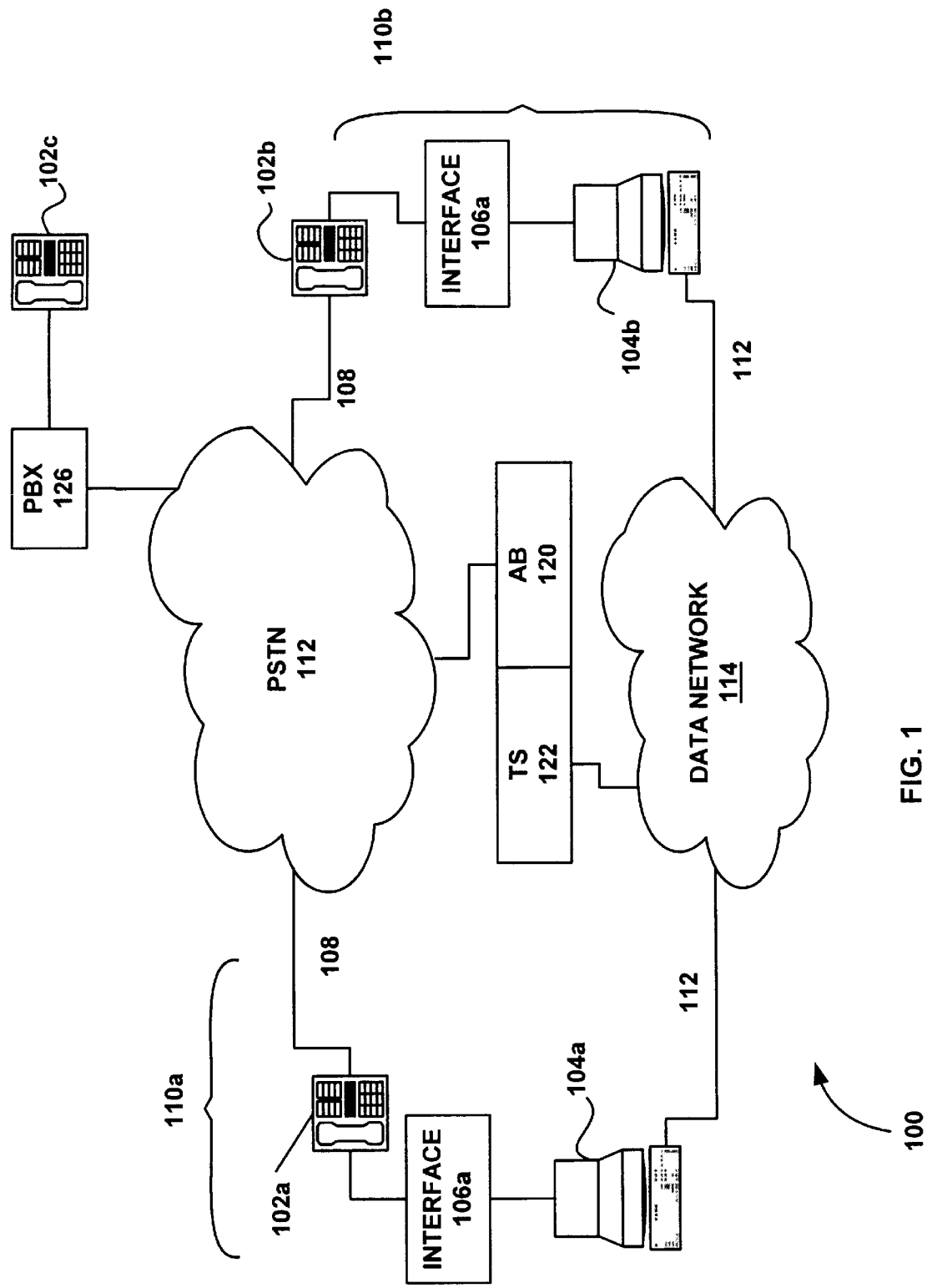
FIG. 1 is a schematic of a system embodying an aspect of the invention.

A teleconferencing captioning system 100 exemplary of the invention is illustrated in FIG. 1. Teleconferencing system 100 comprises a plurality of participants in communication with an audio network, such as Public Switched Telephone Network (PSTN) 112. The participants may be connected to PSTN 112 through stations such as computer/telephony systems 110*a*, 110*b* or conventional telephone appliance 102*c*. Also in communication with PSTN 112 is audio bridge (AB) 120 and teleconference bridge server (TS) 122.

Audio network 112, illustrated as the PSTN, may be any suitable communications network suitable for carrying voice transmissions including, for example, the intranet, a private intranet, a private telecommunications system or other suitable media.

Each computer/telephony system 110*a*, 110*b* comprises a conventional telephone appliance 102*a*, 102*b*, which may be a conventional telephone handset, wireless telephone, enhanced telephone handset (such as the Nortel Networks™ Vista™ 350) or the like, in communication with a computer 104*a*, 104*b* through a telephone/computer interface 106*a*, 106*b*. As will be appreciated, computer/telephone system 110*a*, 110*b* may be integrated into a single unit. A telephone appliance 102*c* is also in communication with PSTN 112 either directly via a voice link 108 or, as illustrated, through a private branch exchange 126. Computer 104*a*, 104*b* of computer/telephone system 110*a*, 110*b* is also in communication, through data link 112, with data network 114. Computer 104*a*, 104*b* may be, for example, a conventional Pentium™ class personal computer, an Apple™ computer, Reduced Instruction Set Computing (RISC) station or other computer device suitable to perform the tasks and operations described herein.

Data network 114 allows for communication between computers 104*a*, 104*b* and teleconference bridge server 122 and may be, for example, an Ethernet network, an internet protocol (IP) network such as the Internet or an intranet, or may be any other suitable network for transmitting the data described herein between computers 104*a*, 104*b* and teleconference bridge server 122.

Teleconference bridge server 122 and conventional audio bridge 120 illustrated as separate units in communication with each other, may, if desired, be combined into a single device that bridges PSTN 112 and data network 114.

Generally, and without limiting the description contained herein, participants to a teleconference contact audio bridge 120 and teleconference bridge server 122 using telephone appliances 102*a*, 102*b*, 102*c* in the conventional fashion. As is known by those skilled in the art, teleconferences can be facilitated in numerous ways. For example, in the participant initiated style of teleconferencing (sometimes referred to as the "meet me" style of teleconferencing) the facilities (e.g., number of ports on audio bridge 120, expected duration of teleconference, etc.) are pre-arranged and those facilities are temporarily assigned to a unique telephone number (the "teleconference number") serviced by audio bridge 120. Participants to the teleconference then, using telephone appliances 102*a*, 102*b*, 102*c*, call the teleconference number and are joined to the teleconference (i.e., audio bridge 120 connects the participant's incoming voice connection to the ports of audio bridge 120 servicing the other teleconferencing participants). Accordingly, each participant is able to be heard by and hear all other participants to the teleconference. An operator assisted teleconference uses a live or automated operator (the live operator may be a participant to the teleconference) which contacts each of the participants, typically in a serial fashion, and upon contacting a new participant joins the new participant to the other previously contacted participants through the facilities of audio bridge 120.

In the present invention, a to-be-joined teleconference participant indicates to teleconference bridge server 122, through a suitable indication signal (e.g., DTMF tones, voice, etc.), the participant's facilities (i.e., telephone appliance 102*c* only, or computer/telephony system 110*a*, 110*b*) and the participant's language requirements (i.e., the participant's preferred spoken language or languages). An identifier of the to-be-joined participant is also generated either by the participant or teleconference bridge server 122. The to-be-joined participant is then connected to the teleconference in the conventional manner (e.g., using conventional "meet-me" or operator assisted teleconferencing methods). In addition, however, for each participant having a computer 104*a*, 104*b* connected to data network 114 (as indicated by the participant's indication signal), teleconference bridge server 122 will attempt to establish a data connection with the participant's computer 104*a*, 104*b*. The network address of a participant's computer 104*a*, 104*b* is determined by a database in the teleconference bridge server 120 which has a network address stored for the participant or, alternatively, through the teleconference bridge server 120 requesting this information from the participant using an Interactive Voice Response (IVR) system. Alternatively, the network address of a participant's computer 104 could be retrieved from a database modelled on the Directory Name Service (DNS) used in the Internet, or upon the Lightweight Directory Access Protocol (LDAP) described in IETF publications 1777, 1778 and 1823—the contents of each of which is hereby incorporated herein by reference.

Upon establishment of a proper data connection, computer 104*a*, 104*b* will launch the teleconferencing text display software described herein. The text display software, which may be an application running under a conventional operating system such as Windows™, MacOS™, Linux, provides the user with a textual display of the teleconference proceedings.

Accordingly, for each participant to a teleconference using system 100, a voice connection and, if available, a data connection, will be established with audio bridge 120 and teleconference bridge server 122. For each participant to the teleconference, the participant's voice signals will be converted through speech to text translation software into a textual representation. This speech to text conversion may be performed at a participant's computer or, as will become apparent, at teleconference bridge server 122. Additional meta-information (i.e. information about the speech information) may also be included in the textual representation. The textual representation of each participant's speech may then be transmitted by teleconference bridge server 122, together with a speaker identifier, to those participants having a display device such as computer 104*a*, 104*b*. Either prior or subsequent to its transmission by teleconference bridge server 122, the textual representation of each participant's speech may be translated from the original speaker's language into text in the preferred language of the recipient participant. This translation may be performed either at a participant's computer or at teleconference bridge server 122. A participant will then be able to understand the speech of other participants by either listening to the teleconference in the conventional manner (if the participant understands the language being spoken at any given time) or by following a transcribed and translated version of each participant's speech which can be displayed by computer 104.

At least for those participants without a display device or those participants connecting via telephone only, teleconference bridge server 122 may, where necessary, translate the textual representation of each participant's speech into one of the languages indicated by the participant during the join-in or initialization process. This translated textual representation of a participant's speech may then be converted into synthesized speech by teleconference bridge server 122 and transmitted to a participant over PSTN 112.

Figure 2:
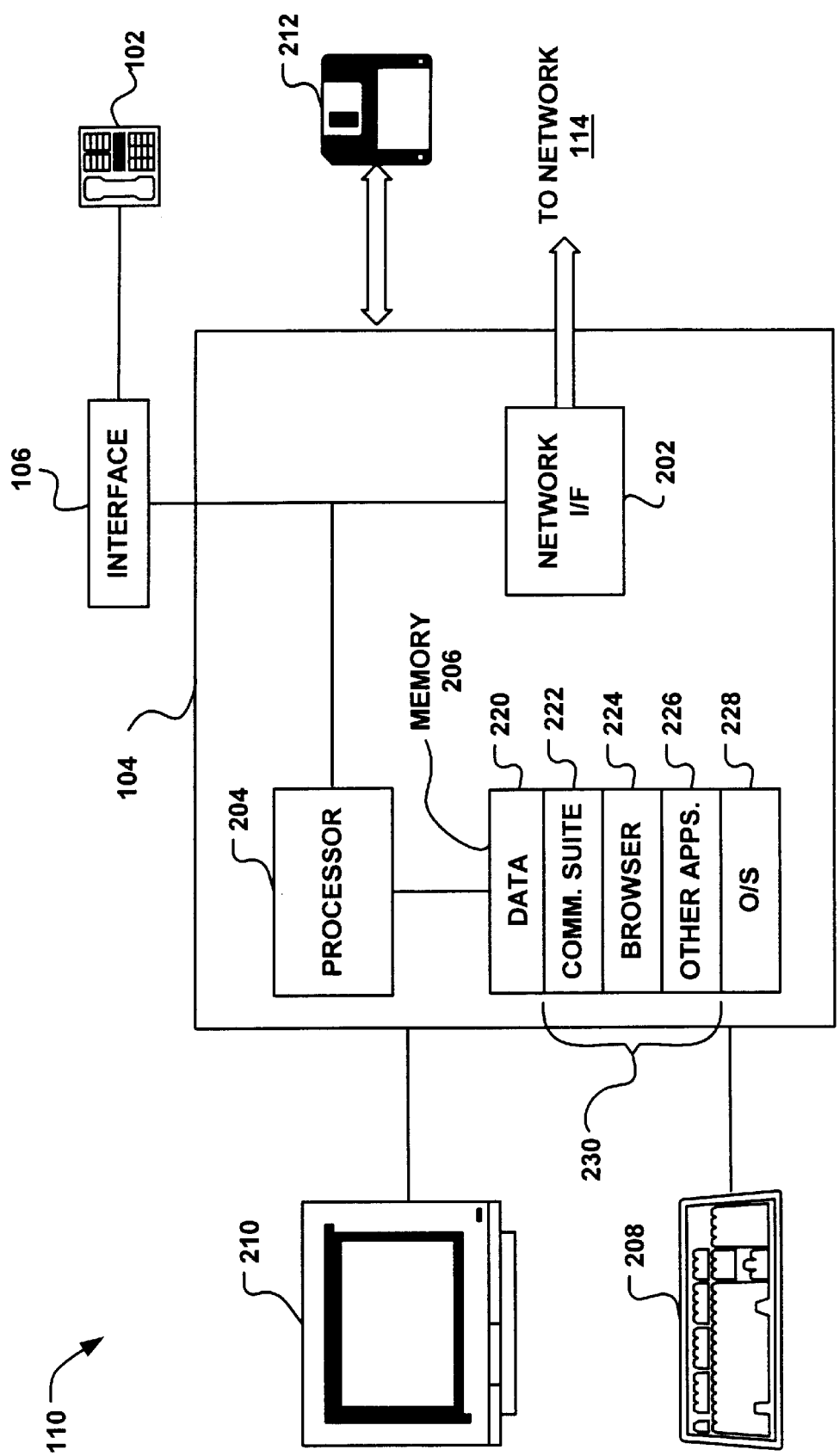
FIG. 2 is a detailed schematic of a first portion of FIG. 1.

Referencing FIG. 2, a computer/telephony system 110 is illustrated. Computer/telephone system 110 comprises a computing device, such as computer 104 connected to display 210, input device 208, data network 114 and telephone appliance 102 through interface 106. Display 210 can be any type of display known in the art. Similarly input device 208 can be comprised of combinations of common input devices such as keyboards, mice, audio input devices or other known input devices. As will be appreciated by those skilled in the art, telephone appliance 102 and interface 106 may integrated into computer 104.

Computer 104 is comprised of a central processing unit (CPU) 204 interconnected to memory 206 and network interface 202. CPU 204 can be an Intel Pentium™, Motorola PowerPC™ or other suitable processor capable of performing the operations necessary to connect computer 104 to data network 114 and perform the operations described herein. Memory 206 is comprised of volatile memory, including Random Access Memory (RAM), and non-volatile memory, such as a hard disk drive or Read Only Memory (ROM) or preferably a combination of these types of memory. Network interface 202 can be a network interface card suitable for communicating with network 114 such as, for example, an Ethernet or Token Ring network card. Computer 104 is also capable of reading computer readable media 212, which may be a diskette, CD-ROM or other method of transferring data to memory 206 of computer 104. As is known to those skilled in the art, computing device 104 is not limited to the embodiment described above, but can be modified to come within the spirit and scope of this invention.

Memory 206 contains the software programs and data necessary to enable a computer 104 to connect and communicate with data network 114. Memory 206 is comprised of data 220, applications software 230 and operating system 228. Operating system 228 preferably, for ease of use considerations, includes a graphical user interface (GUI) such as Microsoft Windows 98™ or the Macintosh Operating System 8™. Application software 230 is comprised of: communications suite 222 for connecting to data network 114, and may include TCP/IP, PPP, SLIP, Ethernet or Token Ring software protocols; textual display application 224 which may be, for example, Netscape Navigator™, Microsoft Internet Explorer™, Mosaic™ or other commercially available browsers (including, if desired, text based browsers such as Lynx™); and other applications 226.

Figure 3:
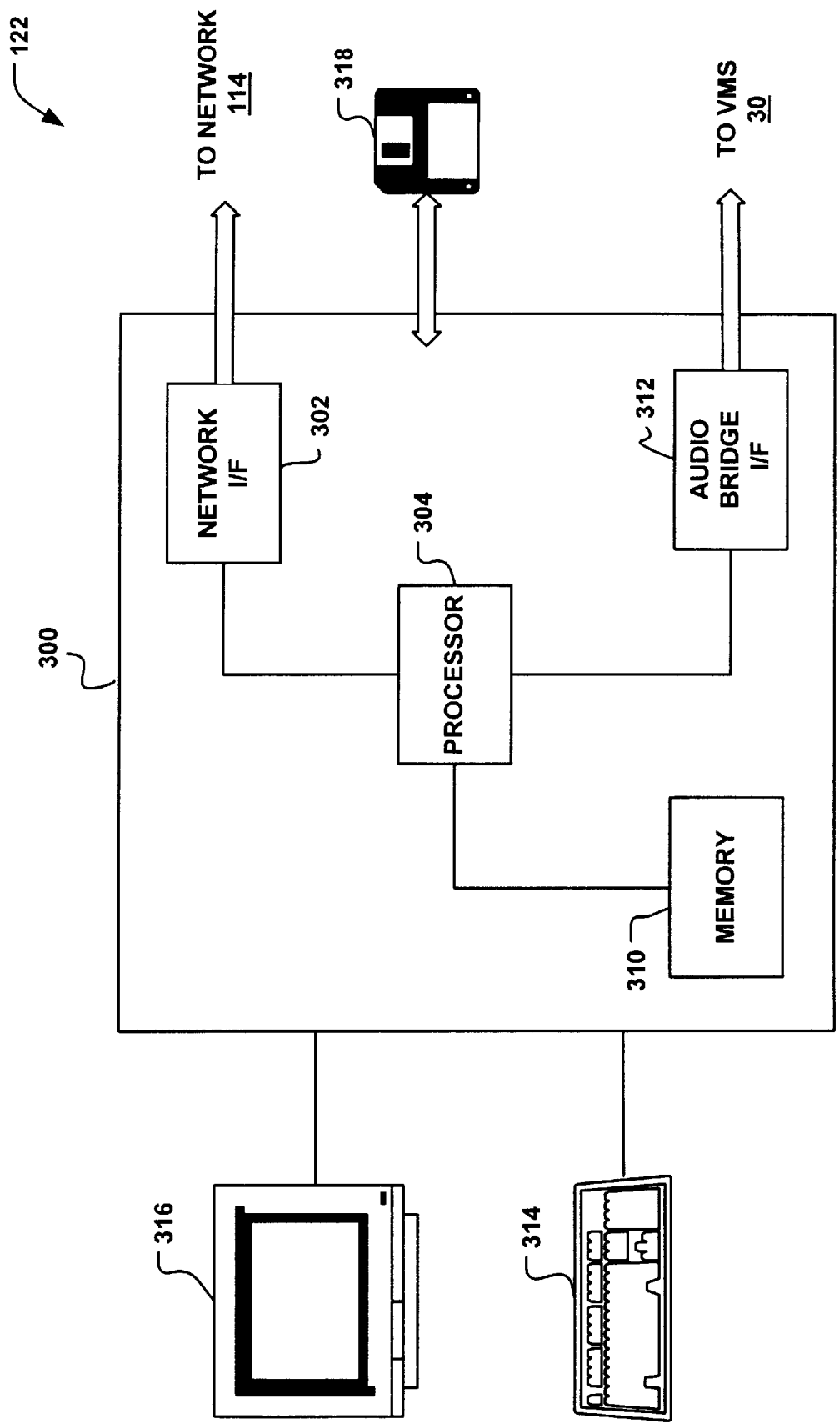
FIG. 3 is a detailed schematic of a second portion of FIG. 1.

Referencing FIG. 3, teleconferencing bridge server 122 is illustrated. Similar to computing terminal 104, teleconferencing bridge server 122 has a computer server 300 optionally connected to a display 316 and input device 314. Computer server 300 is a networked computer connected to network 114. Input device 314 and display 316, while optional, may consist of similar devices corresponding to input device 208 and display 210 of computing device 104.

Computer server 300, as is common in the art, is typically a RISC device such as a Sun Microsystems UltraSparc™ Station, or an IBM RS/6000™ computer. However, computer server 300 may also be a PC such as Compaq Proliant™ or IBM NetFinity™ server or any other computer suitable for connecting to data network 114, audio bridge 120 and suitable for the processes and operations described herein. Computer server 300 is comprised of CPU 304, typically a Sun UltraSparc™ CPU, Motorola or IBM PowerPC™ CPU or Intel Pentium™, Pentium II™ or Pentium Pro™ CPU; interconnected with memory 310, network interface card 302, and Audio Bridge Interface 312. Network interface card 302 is connected to network 114, and may be an Ethernet, Token Ring, ATM card, T1 interface or any other suitable means of communication with a data network to support a teleconferencing participant. Audio bridge interface 312 provides the necessary functionality for communicating with and control of audio bridge 120. Memory 310, which is in communication with CPU 304, consists of a combination of volatile and non-volatile memory, typically RAM, ROM and hard disk drive or optical storage device, used to store data, software applications and an operating system. Computer server 300 is also capable of reading computer readable media 318, which typically is a CD-ROM, diskette or other removable media, sufficient to transfer software or data to computer server 300, generally, and memory 310 specifically. As will be appreciated by those skilled in the art and described above, computer server 300 may incorporate audio bridge 120 thus combining teleconference bridge server 122 and audio bridge 120 into a single unit.

Figure 4:
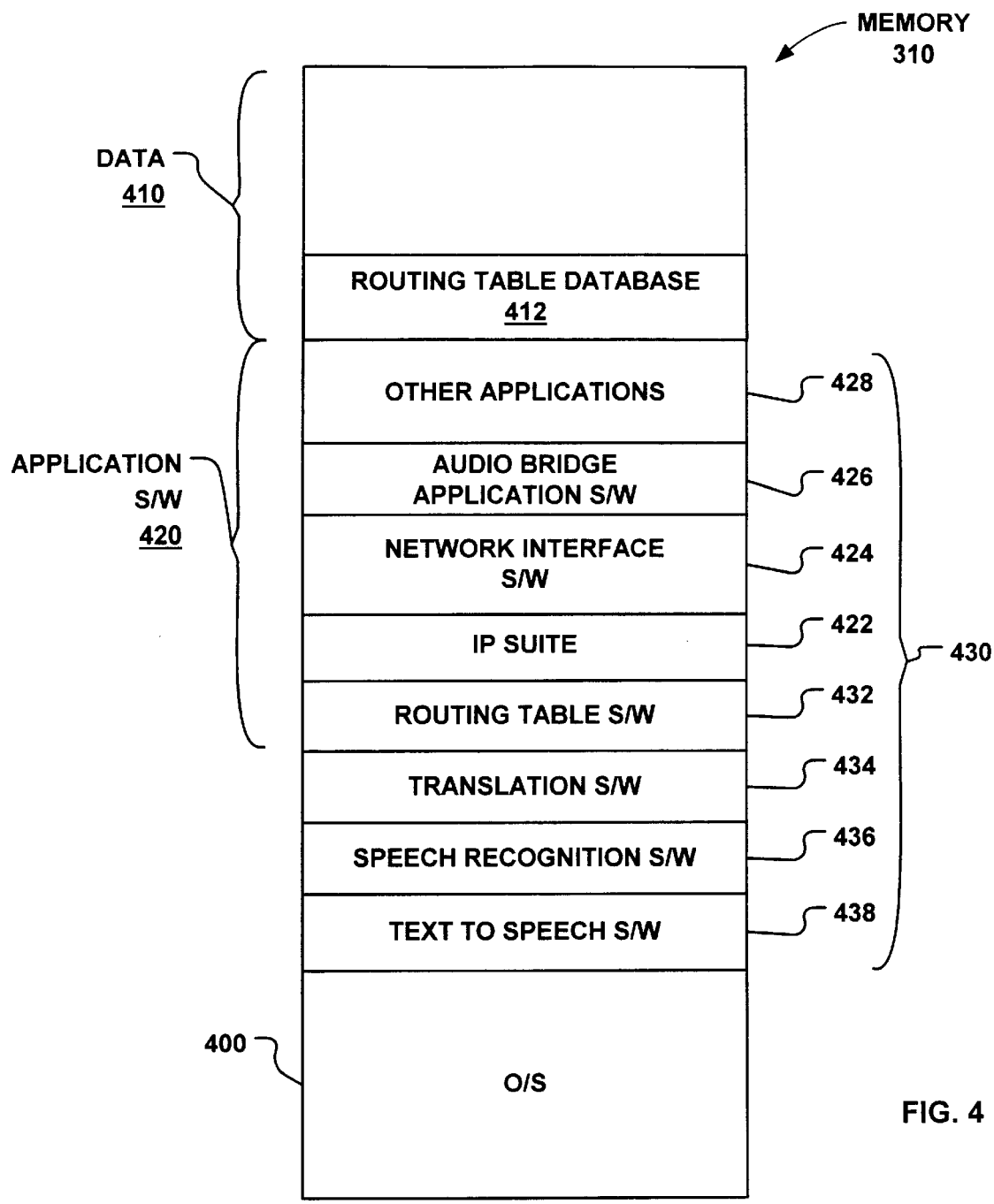
FIG. 4 is a detailed schematic of a first portion of FIG. 3.

Referring to FIGS. 3 and 4, memory 310 of computer server 300 is logically divided into three portions, namely operating system 400, application software 420 and data 410. Operating system 400 of computer is preferably a multitasking operating system such as Unix, Linux, Microsoft Windows NT™, Sun Solaris™ or IBM AIX™. However, an operating system capable of coordinating and performing the operations disclosed below is sufficient. Application software 420, stored in memory 310, is further subdivided into audio bridge application software 426, network interface software 424, IP suite 422, routing table software 432, translation software 434, speech recognition software 436 and other applications 428.

Network interface software 424 enables operation of network interface 302 and maintains communication between the user, via computing device 104, and computer server 300 over data network 114. Audio bridge application software 426 enables the operation of, and communication with, audio bridge interface 312 and allows signals to be passed between audio bridge 120 and server 300. IP Suite software 422, which is only required if data network 114 supports the IP protocols, provides communication protocols, namely the Internet Protocols described in RFC 1011 (the contents of which are hereby incorporated by reference for all purposes) to facilitate communication between computer server 300 and computing device 104 over an IP data network 114.

Data 410 includes routing table database 412 used by routing table software 432. As described in greater detail below, routing table software 432 determines the network address of participants to a conference call through access to routing table database 412, and routes data, over data network 114, destined for these participants to the network addresses retrieved from database 412. Translation software 434, which may be implemented using a number of commercially available translation software packages such as, for example, L&H Power Translator Pro from Lernout & Hauspie Speech Products N.V. of Belgium, translates text from a first language (e.g. English) to a second language (e.g. French). Speech recognition software 436 transcribes speech received by teleconference bridge server 122. As is described in greater detail below, speech recognition software 436, which may be implemented using commercially available software such as IBM's ViaVoice Telephony or Dragon Systems DragonDictate™ or other suitable software, provides speech to text translation capabilities for participants to teleconferences hosted by server 122. Other speech recognition software may used such as software with "speaker adaptive" technologies. "Speaker adaptive" speech recognition software maintains personal training data for each user. The speech recognition can then be performed on a user's local computer 104 or the system may adapted to the speaker's voice during the teleconference by accessing the user's personal training data. Since speech recognition software 436 will likely be used to convert the speech of many users of the system, speech recognition software 436 preferably supports a variety of languages. Further, in order to support a number of users of the system, speech recognition software 436 will likely be speaker independent (i.e., not configured for a particular user).

Audio bridge application software 426 is capable of interrupt handling, data conversion and passing signals between audio bridge 120 and teleconferencing bridge server 122, thus allowing call control of audio bridge 120 from computer 104 over data network 114 and through teleconferencing bridge server 112.

Figure 5:
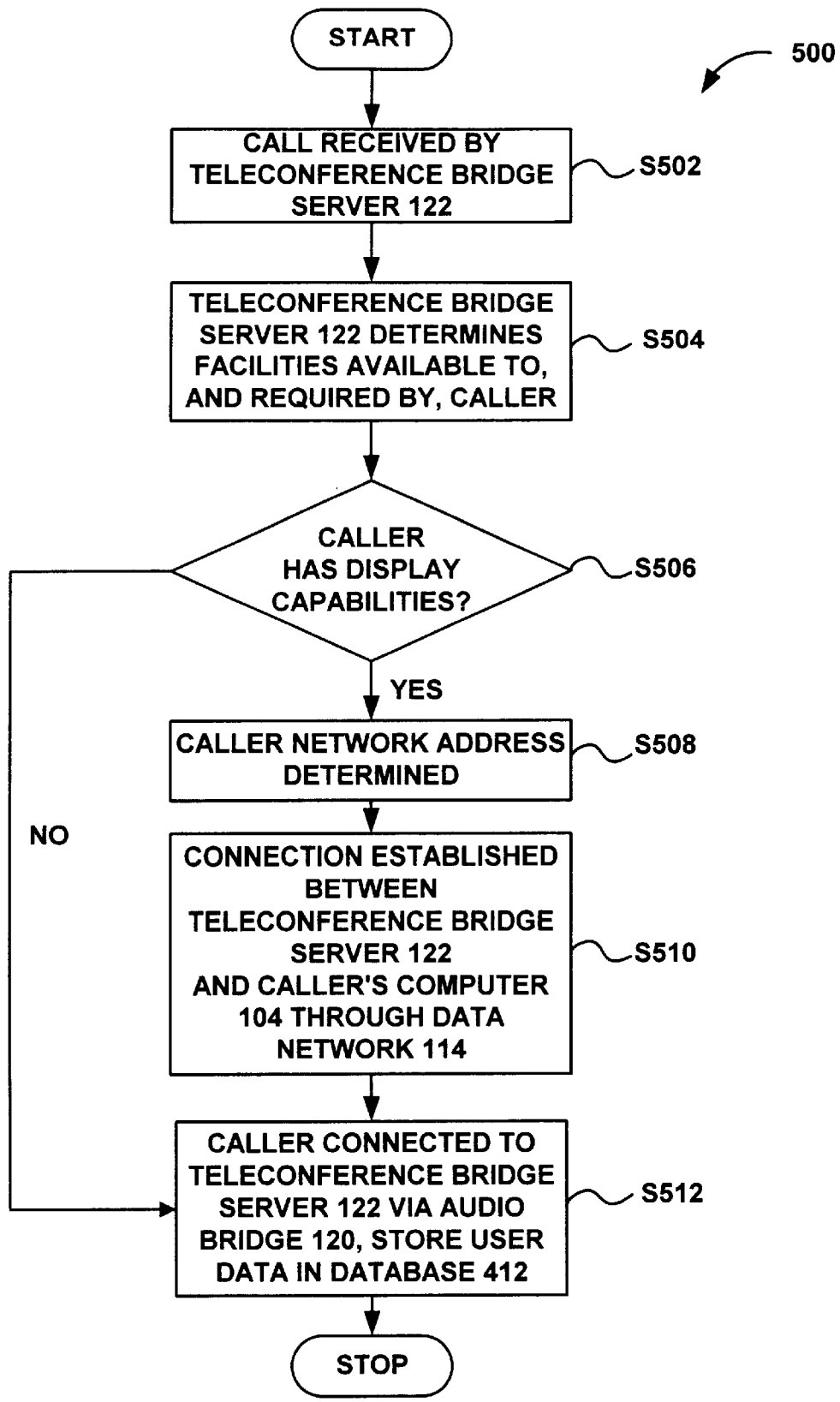
FIG. 5 is a flowchart of operations performed by the system of FIG. 1.

A method of providing teleconferencing services through teleconferencing captioning system 100 is through the performance of operations 500 illustrated in FIG. 5. A caller calls teleconference bridge server 122 using a conventional telephone appliance 102a, 102b, 102c(S502). As will be appreciated, the call may be routed through various elements forming part of PSTN 112 and include, for example, a PBX 126. Alternatively, the call may be transmitted through another voice communication network such as a data network using, for example, Voice over IP (VoIP) technology. In the latter instance, the VoIP connection may be established using, for example, signalling protocol Q.931—the contents of which are hereby incorporated herein by reference. Upon receipt of a call, teleconference bridge server 122 determines the facilities available to the caller (S504). That is, teleconference bridge server 122 determines the facilities/equipment (e.g., display, transcription or translation capabilities) that the caller may have and that can be used to take advantage of the services (beyond conventional audio) provided by teleconference bridge server 122. This determination may be made through an IVR system wherein the caller is asked to respond to conventional selections in a menu system either through voice, DTMF tones generated by the caller's telephone appliance 102a, 102, 102c or other signalling methods including for example, the exchange of facilities information during call set-up. Alternatively, teleconference bridge server 122 may make the determination of the user's facilities by accessing routing table database 412 with routing table software 432. This alternative determination may be made based on the calling party's telephone number (received by teleconference bridge server 122 upon receipt of the call). Teleconference bridge server 122 accesses its database 412 to determine if there is an entry for the calling party. If there is an entry for the calling party, an associated entry in database 412 may indicate the facilities of the caller.

In addition to determining the facilities available to the caller, teleconferencing system 122 also determines the facilities required by the caller. This determination, again, may be made by teleconferencing system 122 requesting such information through an IVR system or by accessing database 412. The facilities that can be made available by teleconferencing system 100 (FIG. 1) include one or more of the following: near real time transcription of the teleconference; transcription translation; and speech or audio conversion facilities. Accordingly, teleconference bridge server 122 may determine the preferred language of the caller and whether transcription and/or translation services are required. Teleconference bridge server 122 then assigns a unique identifier (such as the person's name, calling number, network or IP address or a generated identifier) to the caller.

If it is determined by teleconference bridge server 122 that the caller does not have display capabilities (or does not wish to use the textual capabilities) (S506), teleconferencing system 122 connects the caller to the teleconference, using the facilities of audio bridge 120, controlled through operation of audio bridge application software 426, in a conventional fashion (S512).

If the user does have display capabilities (and is desirous of using these facilities), teleconferencing system 122 determines the network address of the caller's display device (S508). As will be appreciated by those skilled in the art, any type of display may be used to display text including, for example, computers 104, display capabilities in telephone appliance 102 (which may be, for example, a Nortel Networks™ Vista™ 350 using the Analog Display Service Interface—ASDI), a Personal Digital Assistant (PDA) or the like. The data network address may be, for example, an Ethernet or Token Ring address, an IP address, ASDI address or the like. Network address determination can be made in several different ways. Teleconference bridge server 122, through operation of routing table software 432, may access routing table database 412 to determine the data network address of a caller's computer 104. The population of database 412 is described below. Alternatively, the caller may, through operation of an IVR system, indicate to teleconference bridge server 122 the caller's network address. This latter operation may include a participant entering their data network address through the keypad of their telephone appliance 102. A further alternative for determining the caller's network address uses the functions of the H.323 and Q.931 protocols (the contents of both of which are hereby incorporated herein) to determine the network address of VoIP callers.

Once the data network address of the caller is determined, teleconference bridge server 122 attempts to establish a connection between itself and the caller's display device over data network 114 (S510). The establishment of a session may include various handshaking routines to verify and authenticate that the user's display device (such as computer 104) is available for this purpose. Regardless of whether teleconference bridge server 122 establishes a connection, the caller is then connected to the teleconference in the usual manner by operation of audio bridge 120 (S512).

Once the caller (now participant) has been joined the teleconference (S512), teleconference bridge server 122 may, through use of routing table software 432, update database 412 with the information gathered about the participant (e.g., participant's calling number, network address, preferences and facilities) for use in later teleconferences. Alternatively, database 412 may be pre-configured by an operator with a participant's calling number, facilities and network address prior to a teleconference being initiated.

Operations 600 (FIG. 6) are performed by the teleconferencing captioning system 100 (FIG. 1) during the teleconference. A participant's voice is transmitted through telephone appliance 102a, 102b, 102c, via PSTN 112, to audio bridge 120 in the conventional manner. If a participant is also using computer 104 (i.e. a connection has been established between computer 104 and teleconference bridge server 122 over data network 114), the participant's voice may also be simultaneously transmitted to computer 104 through interface 106 (S602). On receipt of the participant's voice, computer 104 performs speech recognition software using appropriate software stored in the applications portion 230 of memory 206 (FIG. 2) to convert the received speech to text (S604). The speech recognition software may be speaker independent or speaker dependent, although speaker dependent software may be especially preferable as it tends to be more accurate. Speaker dependent speech recognition software may be preferable where a participant speaks in a heavily accented manner. Speech recognition software may be implemented with commercially available software such as IBM™ ViaVoice or Dragon Systems DragonDictate™ or other suitable software. The speech to text conversion preferably occurs in real or near-real time.

Once the textual representation of the participant's speech has been generated, computer 104 through operation of communications suite 222 and network interface 202, transmits the textual representation of the participant's speech to teleconference bridge server 122 over data network 114 (S606). It should be noted, that the generation of the textual representation of the participant's speech occurs in real or near-real time. Accordingly, while the participant is speaking, generation of the textual representation is on-going. That is, the textual representation is streamed from the speech recognition engine to teleconference bridge server 122 as a live, running transcription. On receipt of the generated text, teleconference bridge server 122, accesses routing table database 412, determines the preferred language of the other teleconference participants, and through translation software 434, translates the received text into the preferred language of each participant (S608). Translation may also occur in real or near-real time on a word by word basis. However, in order to accommodate all of the different grammatical variations amongst languages, a phrase by phrase or sentence by sentence translation may be preferred as the translation may be more accurate. In this latter case, the generated textual representation of the participant's speech will be collected, or buffered, until a sentence or phrase had been completed. At this point, the translated text would be generated from the textual representation. As will be apparent, teleconference bridge server 122 and translation software 434 may translate the received text to more than one other language. Once the translation has been completed, teleconference bridge server 112 transmits the (possibly) translated textual representation together with the unique identifier identifying which participant generated the speech to each participant using a display (S610). The display of the textual representation may occur in real or near-real time. Similarly, depending upon if translation is required and the speed of any translation, a translated textual representation of a participant's speech may also be displayed in real or near-real time. As is apparent, operations 600 describe a client-server architecture that may be implemented with teleconferencing system 100 (FIG. 1) with computers 104 acting as intelligent clients to teleconference bridge server 122.

Operations 700 (FIG. 7) may be performed instead of, or simultaneously with, operations 600. Operations 700 may be performed where a more centralized architecture (as compared with the client-server architecture of operations 600) is desired. A centralized architecture may be desirable in the instance where a participant's facilities are unable to perform speech to text translation (e.g., where the participant does have access to a computer 104a, 104b or where the participant's computer 104a, 104b is incapable of performing near real time transcription), since it is, nevertheless, still desirable to transcribe this type of participant's comments. Accordingly for this type of participant, their speech will be transmitted from their telephone appliance 102a, 102b, 102c through PSTN 112 to audio bridge 120 and teleconference bridge server 122 (S702). Upon receipt of the transmission, teleconference bridge server 122, through operation of speech recognition software 436, transcribes the received speech into text (S704). Once transcribed, and as in operations 600, teleconference bridge server 122 translates the text generated in S704 into each participant's preferred language (S706) and transmits, through network 114, the transcribed and translated speech to each participant who is capable of and wishes to receive text messages (S708).

Figure 6:
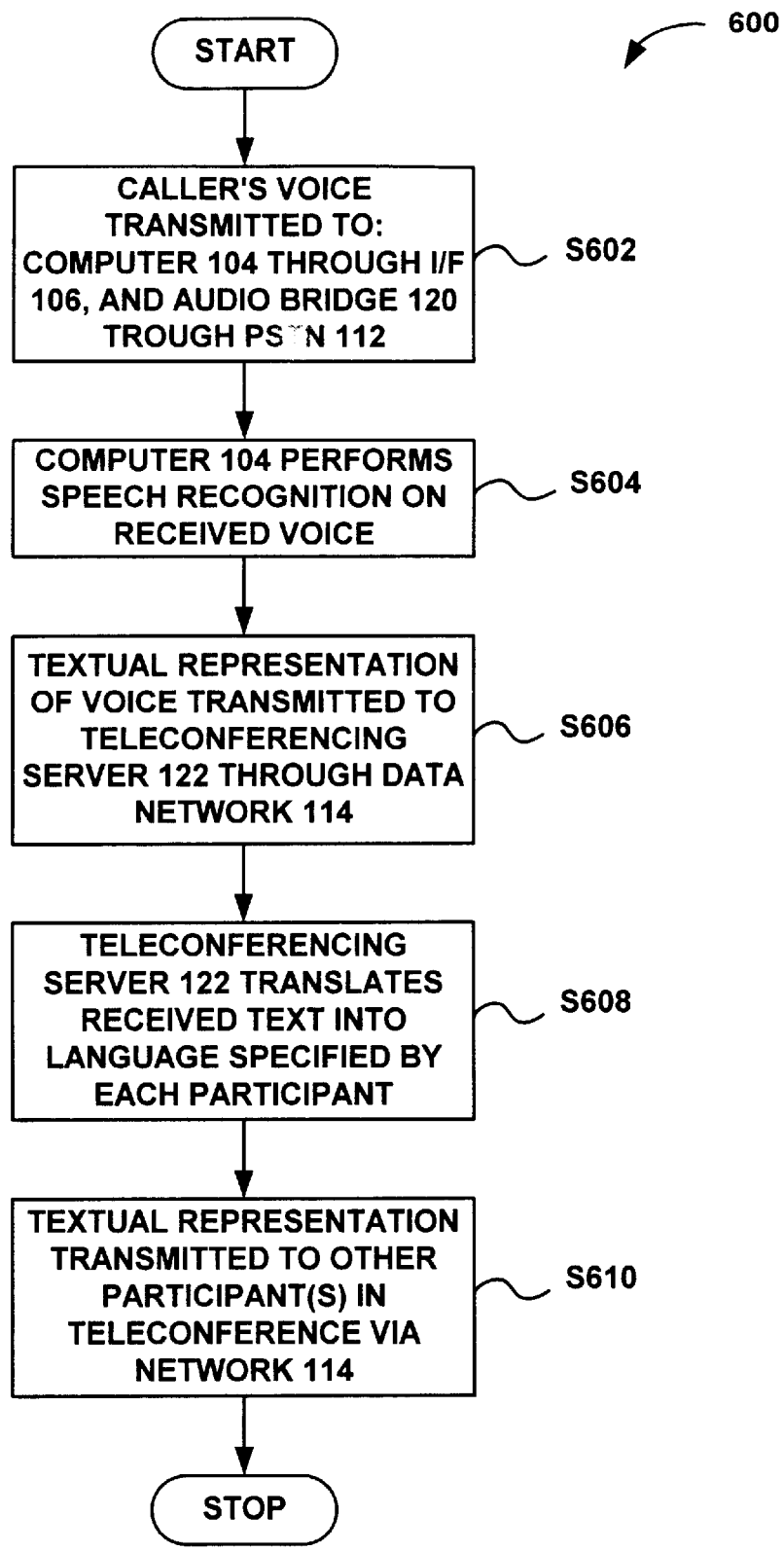
FIG. 6 is a flowchart of further operations performed by the system of FIG. 1.
Figure 7:
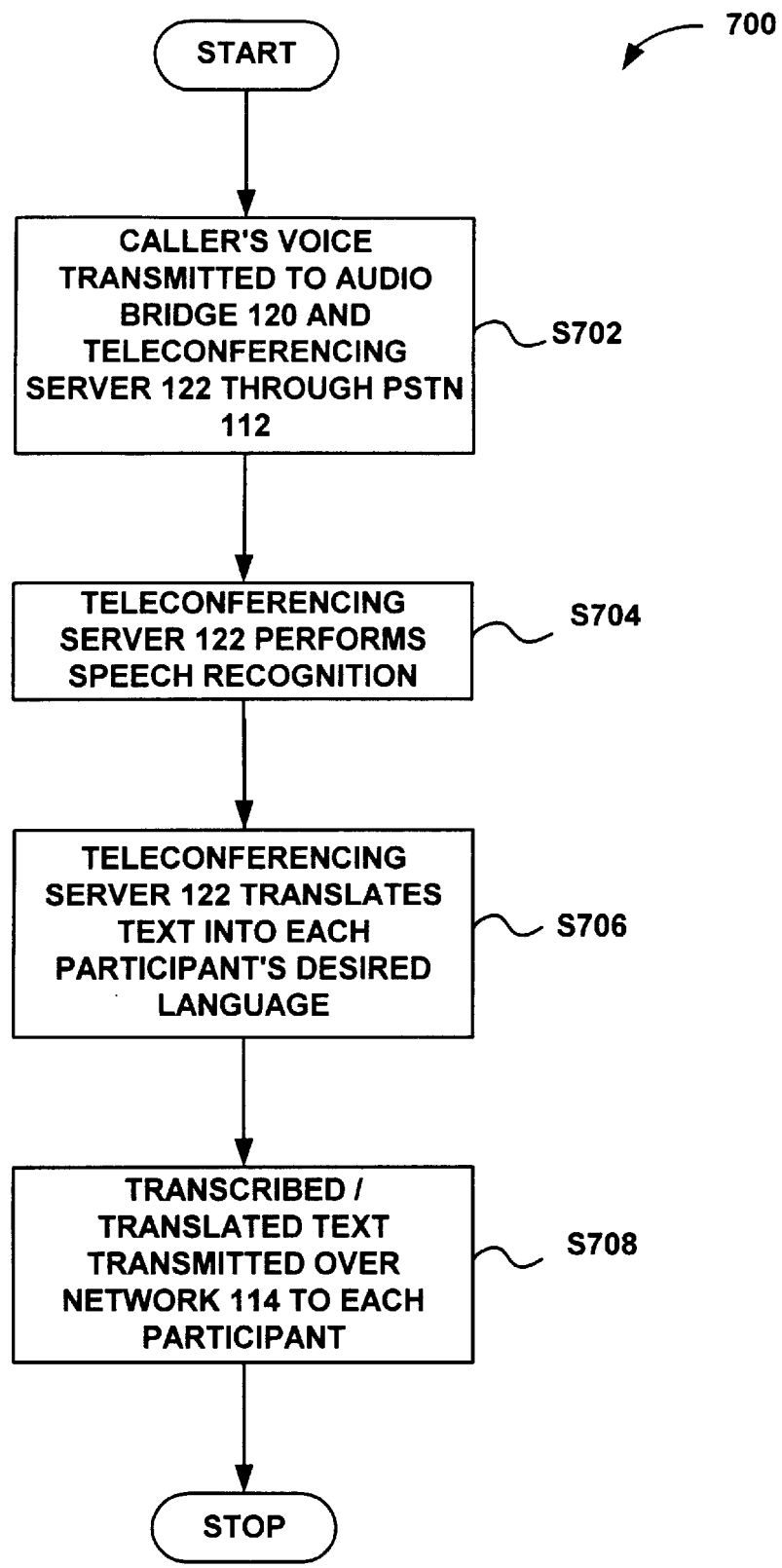
FIG. 7 is a flowchart of further operations performed by the system of FIG. 1.
Figure 8:
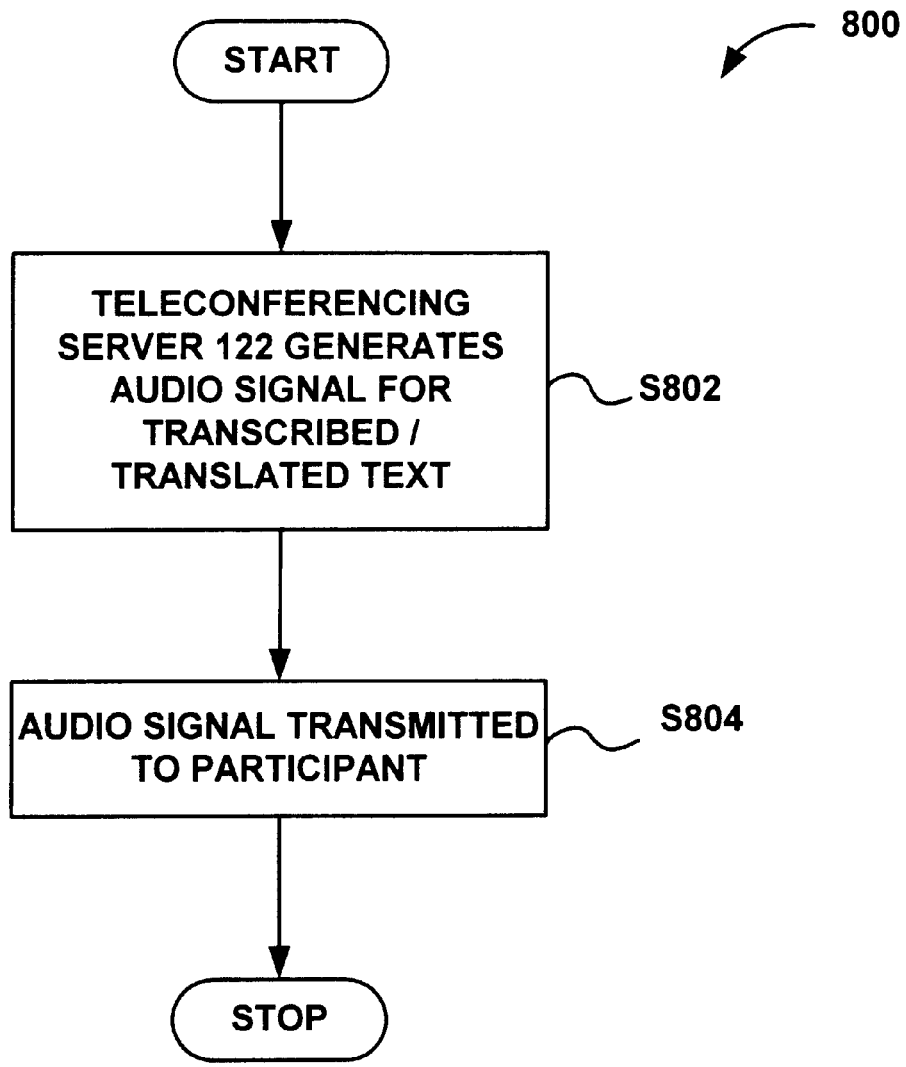
FIG. 8 is a flowchart of further operations performed by the system of FIG. 1.
Figure 9:
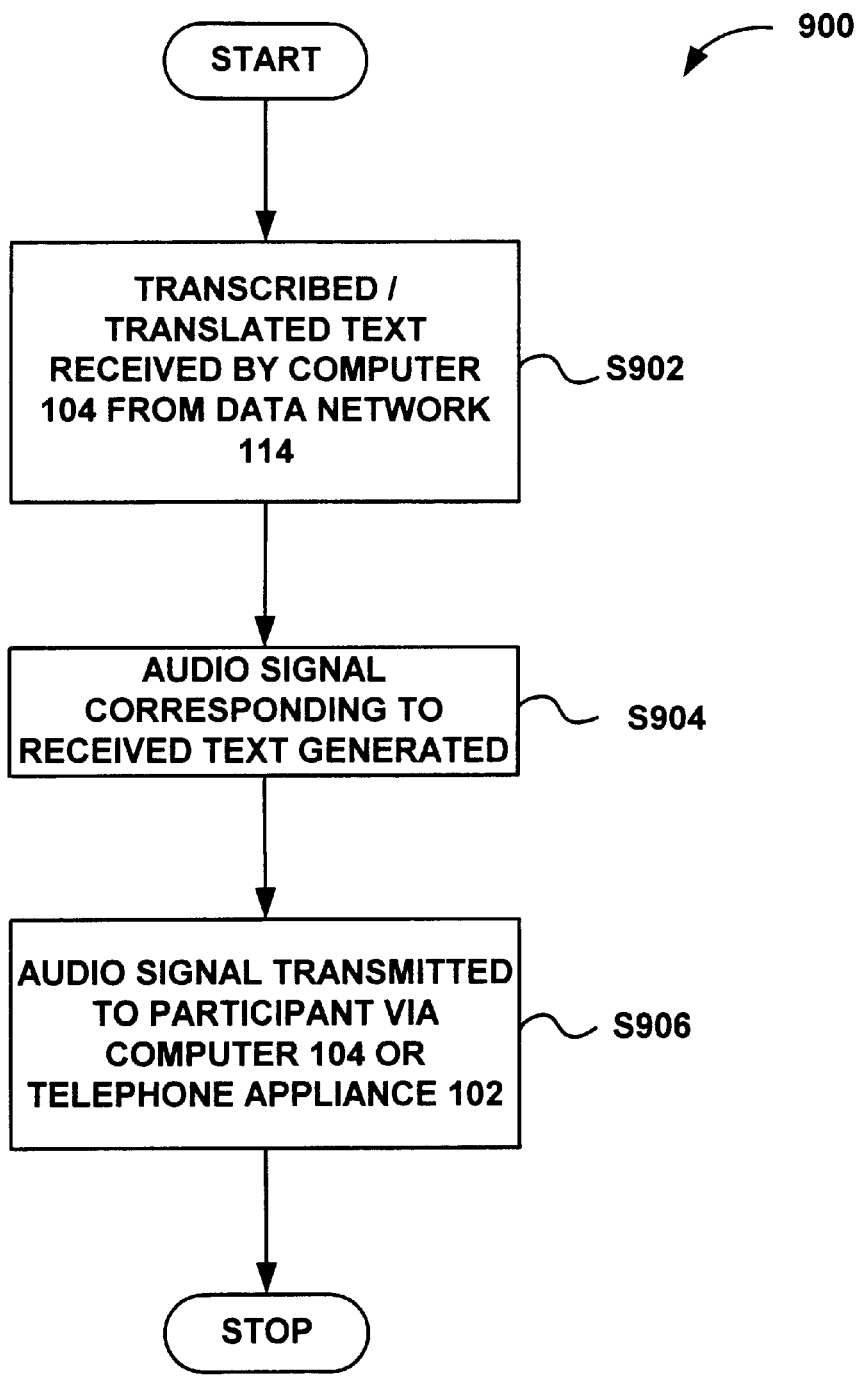
FIG. 9 is a flowchart of further operations performed by the system of FIG. 1.

Operations 800 (FIG. 8) and operations 900 (FIG. 9) may also be performed in conjunction with operations 600 (FIG. 6) and operations 700 (FIG. 7). Operations 800 and 900 are performed for participants desiring complete audio translation facilities. As before, the participants desiring this type of service may or may not have the necessary facilities (e.g., the participant's computer 104 is incapable of performing text to speech conversion or, alternatively, the participant does not have or is not using a computer). For participants to a teleconference not having or not using facilities to provide text to speech conversion service, text to speech conversion may be provided by teleconference bridge server 122 through operation of text to speech software 438. Operations 800 are performed to provide this centralized text to speech conversion service.

Operations 800 are typically performed upon completion of the translation (S706) of received audio transmissions by teleconference bridge server 122. However, in some instances (for example, where a participant has the facilities to perform speech to text—operations 600—but no facilities to provide text to speech) operations 800 may be performed after step S608 (FIG. 6). Once a participant's speech has been transcribed and translated into text in the participant's desired language, teleconference bridge server 122, through operation of text to speech software 438 (FIG. 4) generates an audio signal that corresponds to the transcribed and translated text (S802). This audio signal may then be transmitted to a participant over PSTN 112 (S804) via audio bridge 120. Alternatively, a digital stream of audio data corresponding to the transcribed text may be transmitted to a participant over data network 114. Such an audio stream may conform to many well known streaming audio formats such as, for example, RealAudio™ by Real Networks Inc. As will be appreciated, a participant will need to identify the identity of the originating speaker for the audio signal generated in step S802. Accordingly, it may be desirable to transmit the audio signal generated in S802 simultaneously with the original audio signal to a participant. However, the audio signal generated in S802 will need to be transmitted at a volume greater than the original audio signal. However, due to regulatory restrictions, it may be inadvisable to increase the volume of any signal arbitrarily. Accordingly, and alternatively, the original audio signal can have its volume reduced. A participant could control the volume of each audio stream received. Accordingly, a participant listening, and using the audio translation facilities, will be able to focus their attention on the dominating audio signal generated in S802 while being able to identify the speaker by, simultaneously, listening to the relatively suppressed original audio signal. Alternatively, the audio signal generated in S802 can replace the audio signal corresponding to the speaker's voice for participants using the translation facilities of system 100 (FIG. 1). In this alternative embodiment, for participants using the audio translation facilities, teleconference bridge server 122 will not transmit the original audio signal corresponding to the voice of other participants. Rather, the audio signal generated in S802 will be directly transmitted to these participants. In this instance, transmitted with the generated audio signal will be an audio identifier that a listening participant can use to determine the identity of the original speaker. The audio identifier may be, for example, audible tones with unique tones for each speaker, a unique number of audible tones generated for each participant, an audio clip of a participant's name, a synthesized identifier or the like. In a further alternative, an automatic gain control circuit could be employed that would transmit a speaker's voice to a listening participant at its original volume until the translated audio stream had been generated. At this point, the automatic gain control circuit would reduce the volume of the original audio signal and combine it with the generated and translated audio signal and present this combined audio signal to the participant/ listener.

As an alternative to the centralized audio translation services (operations 800—FIG. 8), participants to a teleconference may be provided with audio translation facilities through operation of similar text to speech conversion software stored by the participant's computer 104. Operations 900 are performed to provide this "client-server" configured audio translation service. Operations 900, similar to operations 800, are designed to provide an audio translation to a participant to a teleconference. Accordingly, a participant's local computer 104 receives the textual representation from data network 114 (S902) following the translation of S610 or S708. The participant's computer 104 then, using text to speech software stored as another application 226, generates an audio signal from the received textual representation (S904) which is transmitted to the participant directly by computer 104 (using, for example, an audio output of computer 104) or via telephone appliance 102 and interface 106 (S906). With this operation, there is no need for teleconference bridge server 120 to transmit the original audio signal. Rather, the audio signal generated in S902 by a participant's computer 104 will be transmitted to the participant.

As will be apparent, operations 600, 700, 800 and 900 (FIGS. 6, 7, 8 and 9 respectively) may be performed to provide transcription and/or translation facilities from any number of languages to any number of languages. To reduce the number of languages supported by the transcription and/or translation software, it may be preferable for teleconferencing system 100 to perform translations from a first language to a second language in more than one step: i.e., intermediate languages may be used. For example, it may be easier to implement the above-described system to provide translation from a first uncommon language (e.g., Afrikaans) to a second uncommon language (e.g., Dutch) by translating the first language (e.g. Afrikaans) to an intermediate and common language (e.g., English, Chinese, Spanish) and then from this intermediate language to the second language (e.g., Dutch). This style of implementation may be desirable in the client-server architecture since speaker dependent speech to text software can be used for the translation from the first language (e.g. Afrikaans) to an intermediate language prior to transmitting to teleconference bridge server 122. In this embodiment, either teleconference bridge server 122 or a participant's computer 104 could then perform the translation from the intermediate language to the desired second language. In either instance, teleconference bridge server 122 or a participant's computer 104 would need only support a limited number of intermediate (and common) languages. This alternative arrangement can further distribute the operations performed in system 100 to the client if the intermediate textual representation of the speech of a participant is transmitted to all other teleconference participants without further translation and step S608 is not performed by teleconference bridge server 122 but, rather, the translation is performed by each client after transmittal of the intermediate text to the client in S610. Memory 206 (FIG. 2) of computer 104 would then require the incorporation of translation software. This latter alternative embodiment in illustrated as operations 1100 of FIG. 11.

Figure 11:
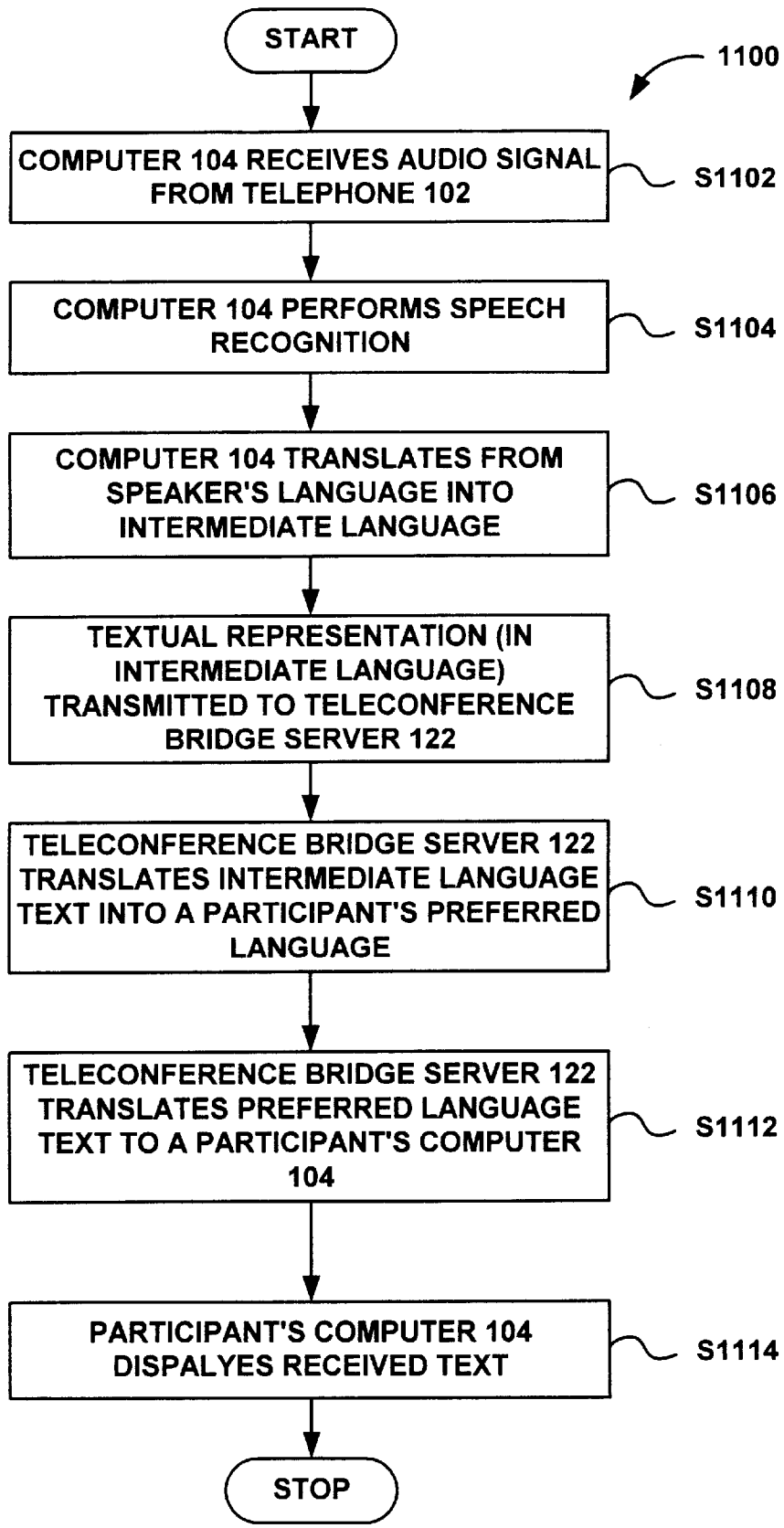
FIG. 11 is a flowchart of further operations performed by the system of FIG. 1.

Referencing FIG. 11, in S1102 a participant's computer 104 (FIG. 2) receives an audio signal from telephone appliance 102. Computer 104 performs speech to text conversion using (speaker dependent) speech recognition software stored in memory 206 (S1104). As described above, the language spoken may be a relatively uncommon language (or, for example, heavily accented or in an uncommon dialect). The textual representation of the participant's voice is then translated from the participant's language to an intermediate, and relatively more common, language (S1106). The textual representation of the participant's speech, in an intermediate language, is then transmitted from computer 104 over data network 114 to teleconference bridge server 122 (S1108). Teleconference bridge server 122 translates, for each participant to the teleconference, this received text (in the intermediate language) into one of the participant's preferred languages (S1110). The text, now in the participant's preferred language is then transmitted, over data network 114, to the participant's computer 104 (S1112) where it is received and displayed (S1114). Alternatively, the translation from the intermediate language into a participant's preferred language by teleconference bridge server 122 could be omitted (i.e., S1110 is omitted). In such case, a participant's computer 104 will perform translation from the intermediate language into the participant's preferred language prior to displaying the text in S1114. In this alternative arrangement, a participant's computer 104 would require translation software supporting the intermediate language stored in memory 206 (FIG. 2).

In a further alternative, speech may be transcribed into data corresponding to a meta-text language in steps S604 and S704. The meta-language data may consist of a descriptor as to the grammatical function of a spoken word (i.e., verb, noun, adjective, adverb, etc.) and an index into a global dictionary which identifies a word. A participant's speech would then be translated from the speaker's native tongue into the meta-language (which may be performed either at the speaker's computer or centrally by teleconference bridge server 122) and from the meta-language to a listener's preferred language. An example of a meta-language is the Extensible Markup Language (XML), known to those skilled in the art. Using XML, the parts of speech can be identified using XML tags. Another meta-language has been described by Noam Chomsky as a "Context Free" grammar which is well modeled using the Backus-Naur Form (BNF) grammar. Background on meta-languages in general can be found in "Interlingual Training and Technology", by Peter Wilberg, Language Engineering Services, published in Humanising Language Teaching, Year 1; Issue 2, April 1999 published by Pilgrims Ltd., of England, the contents of which are hereby incorporated herein by reference.

In a still further alternative, speech recognition may be distributed between a participant's telephone appliance 102 and teleconference bridge server 122. In this further alternative, feature extraction may be performed by a signal processor (such as a DSP) in the telephone appliance 102 of the participant while the pattern mapping functionality of the speech recognition could be performed by teleconference bridge server 122.

In a still future alternative, each participant could have a speech recognition agent (i.e., the speaker dependent routines of conventional speaker dependent voice recognition software for a particular user) stored and used centrally by teleconferencing bridge server 122. Speech recognition software 436, in conjunction with the speech recognition agent, could be used to provide speaker dependent voice recognition for each participant in a teleconference. Use of a speech recognition agent may be preferred where participants have thick or heavy accents or there are a number of dialects for a specific language.

Figure 10:
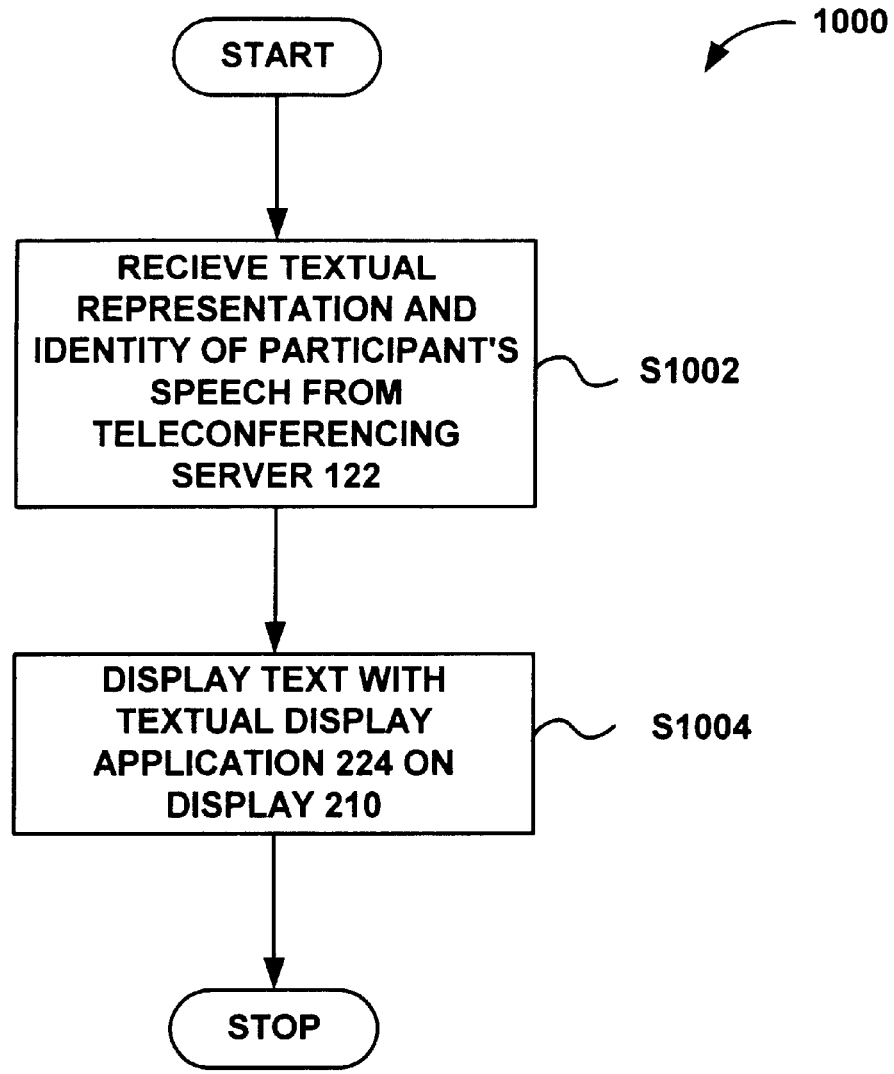
FIG. 10 is a flowchart of further operations performed by the system of FIG. 1.

FIG. 10 illustrates operations 1000 which are performed by a participant's display 210 (FIG. 2) to display the transcripts generated during a teleconference. Textual data transmitted over network 114 by teleconference bridge server 122 will be received by a participant's computer 104 through operation of network interface card 202 and communications suite 222 (S1002). Forming part of this received transmission will be an identifier (generated in S504—FIG. 5) which uniquely identifies the participant with whom the transcribed speech is associated. On receipt of the text and identifier, a participant's textual display application 224 displays the text on display 210 (S1004). So that a participant may more easily follow the transcribed teleconference it is preferred that text associated with each participant be displayed in a unique manner. This may include, for example, associating each unique identifier with a specific color and displaying text associated with a particular participant in the associated color. Alternatively, an application window may be created for each participant to the teleconference. Thereafter, the text associated with a particular participant will be displayed in an associated window. An identifier, such as a time stamp or sequence number may be used to assist participants in following the transcript of the teleconference in the proper sequence. Other alternative display techniques may also be used.

Based on the foregoing description, each participant to a teleconference convened using the facilities of teleconferencing system 100 (FIG. 1) will be provided with one or more of the following services: a textual representation of each participant's comments in a language chosen by the participant; and audio translation of each participant's comments. The transcription and translation services provided by teleconferencing system 100 may be implemented based on a client-server model or based on a centralized model. Both models may be implemented simultaneously by teleconferencing system 100 based on the facilities/equipment of each participant.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

I claim:

1. A method of providing teleconferencing services to a plurality of stations by a teleconference server, said method comprising:
   for each of a plurality of stations,
      receiving a call from the station,
      determining capabilities of the station, and
      if the capabilities of the station comprise a computing device,
         determining a network address of the computing device associated with the station, and
         establishing a connection with the computing device over a data network;
   receiving a received audio signal from a first one of the plurality of stations; and
   transmitting text data corresponding to the received voice audio signal over the data network to a second one of the plurality of stations.

2. The method of claim 1 further comprising:
   receiving the text data corresponding to the received voice audio signal from the first one of the plurality of stations over the data network from the computing device.

3. The method of claim 2 wherein the received text data corresponding to the received voice audio signal from the first one of the plurality of stations is received in a first language and the text data transmitted over the data network to the second one of the plurality of stations is transmitted in a second language.

4. The method of claim 1 further comprising:
   prior to the transmitting text data corresponding to the received voice audio signal over the data network to the second one of the plurality of stations, transcribing the received voice audio signal into the text data.

5. The method of claim 4 wherein the transcribing is performed by at least one of the computing device and a central server.

6. The method of claim 1 wherein the voice audio signal received from the first one of the plurality of stations is received in a first language and the text data transmitted over the data network to the second one of the plurality of stations is transmitted in a second language.

7. A computer readable media comprising computer readable computer code for providing teleconferencing services to a plurality of stations, the code causing a computer to:
   for each of a plurality of stations,
      receive a call from the station,
      determine capabilities of the station, and
      if the capabilities of the station comprise a computing device,
         determine a network address of the computing device associated with the station, and
         establish a connection with the computing device over a data network;
   receive a voice audio signal from a first one of the plurality of stations; and
   transmit text data corresponding to the received voice audio signal over the data network to a second one of the plurality of stations.

8. The computer readable media of claim 7 wherein the computer is further adapted to:
   receive the text data corresponding to the received voice audio signal from the first one of the plurality of stations over the data network from the computing device.

9. The computer readable media of claim 8 wherein the computer is further adapted to:
   receive the text data corresponding to the received voice audio signal from the first one of the plurality of stations in a first language; and
   transmit the text data in a second language over the data network to the second one of the plurality of stations.

10. The computer readable media of claim 7 wherein the computer is further adapted to:
    prior to the transmitting text data corresponding to the received voice audio signal over the data network to the second one of the plurality of stations, transcribe the received voice audio signal into the text data.

11. The computer readable media of claim 7 wherein the computer is further adapted to:
   receive the voice audio signal from the first one of the plurality of stations in a first language; and
   transmit the text data in a second language over the data network to the second one of the plurality of stations.

12. A method of providing teleconferencing services to a plurality of stations by a teleconference server, said method comprising:
   for each of a plurality of stations,
      receiving a call from the station,
      determining capabilities of the station, and
      if the capabilities of the station comprise a computing device,
         determining a network address of the computing device associated with the station, and
         establishing a connection with the computing device over a data network;
   receiving a voice signal from a first one of the plurality of stations; and
   transmitting text data corresponding to the voice signal over the data network to a second one of the plurality of stations.

13. The method of claim 12 wherein the received voice signal is in the form of text data.

14. The method of claim 12 wherein the received voice signal is in the form of a voice audio signal.

15. The method of claim 12 further comprising:
   receiving the text data corresponding to the received voice signal from the first one of the plurality of stations over the data network from the computing device.

16. The method of claim 15 wherein the received text data corresponding to the received voice signal from the first one of the plurality of stations is received in a first, language and the text data transmitted over the data network to the second one of the plurality of stations is transmitted in a second language.

17. The method of claim 12 further comprising:
   prior to the transmitting text data corresponding to the received voice signal over the data network to the second one of the plurality of stations, transcribing the received voice signal into the text data.

18. The method of claim 17 wherein the transcribing is performed by at least one of the computing device and a central server.

19. The method of claim 12 wherein the voice signal received from the first one of the plurality of stations is received in a first language and the text data transmitted over the data network to the second one of the plurality of stations is transmitted in a second language.

* * * * *